Patented June 24, 1924.

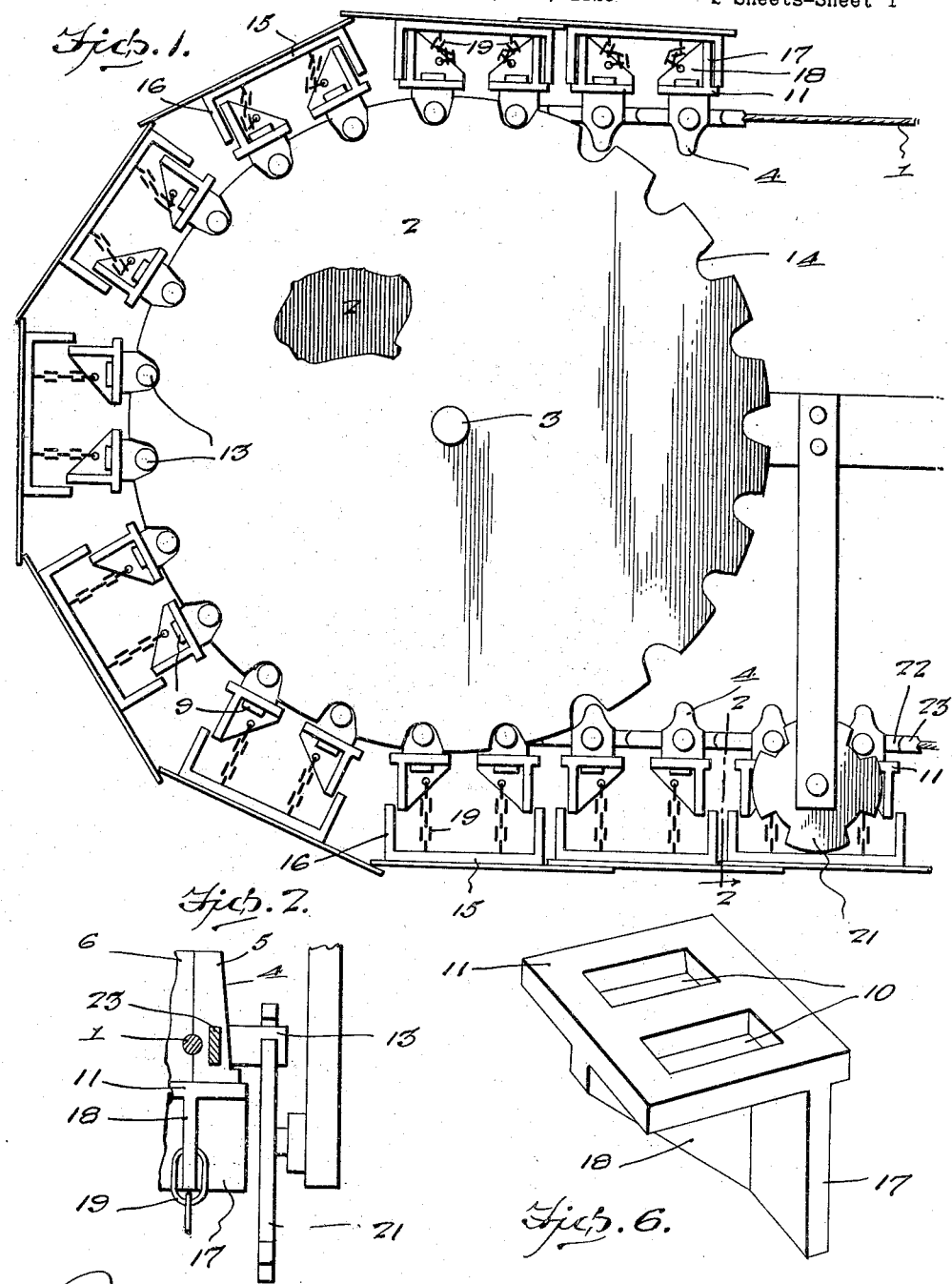

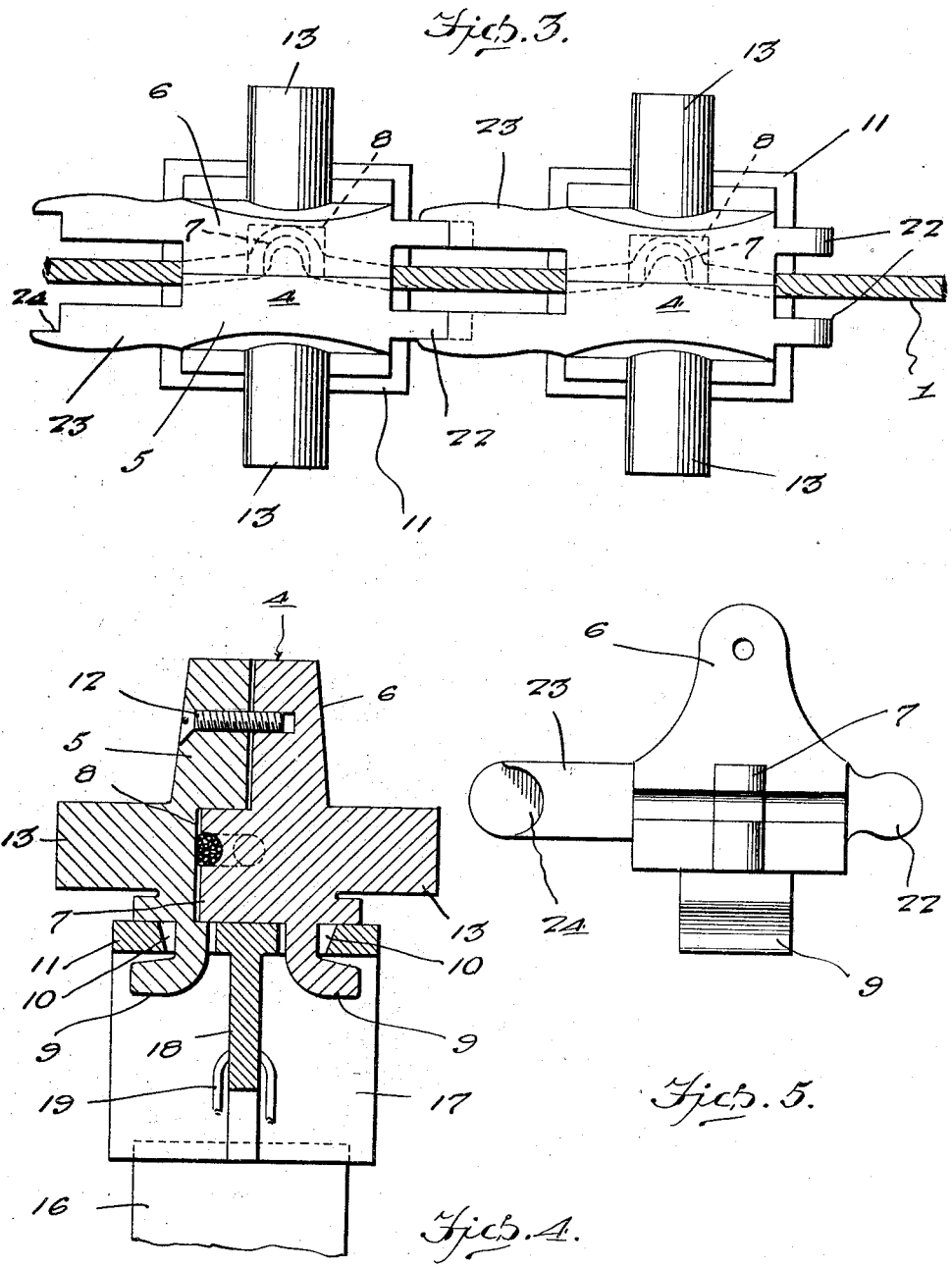

1,498,845

UNITED STATES PATENT OFFICE.

MILTON D. LAKIN, OF COLUMBUS, OHIO.

CABLE HITCH.

Application filed September 4, 1923. Serial No. 660,964.

*To all whom it may concern:*

Be it known that I, MILTON D. LAKIN, a citizen of the United States, residing at Columbus, in the county of Franklin and State of Ohio, have invented new and useful Improvements in Cable Hitches, of which the following is a specification.

The principal object of this invention is to provide means for connecting objects to a cable which is adapted to pass over a pulley in such a manner that wear on the cable is prevented by the connecting means.

The device is mainly designed for forming a conveyor or carrier, the supporting plates or parts thereof being carried by a plurality of hitches which are clamped to the cable and which have their portions engaging each other.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a portion of a conveyor constructed in accordance with my invention.

Figure 2 is a section on line 2—2 of Figure 1.

Figure 3 is an enlarged view of a pair of hitches.

Figures 4, 5 and 6 are detail views of one of these hitches.

In these views 1 indicates the pair of cables which engage the pulleys 2 which are arranged on the shaft 3. The hitches are shown at 4, and each hitch is composed of a pair of clamping members 5 and 6 for clamping the cable between them. Each member has a groove on its inner face for receiving the cable and one member has a grooved projection 7 for engaging a recess 8 in the other member, this projection forcing the cable into the recess so that the cable is firmly gripped by the members. The top of each member is provided with a hook-shaped tongue 9, the tongues being adapted to engage slots 10 formed in a plate 11. The tongues and slots are so formed that when the tongues are inserted in the slots, which is done by tilting the member to cause the hooked end to enter the slot and then bringing the members together, the members are held in clamping position. A screw 12 is passed through the lower ends of the two members to help hold them in clamping position. Each member is provided with a projection 13 for engaging the notches 14 in the pulleys so that the pulleys will carry the hitches around with them and thus impart movement to the conveyor.

Any desired form of device may be connected with the plates of the hitches but I prefer to form the conveyor of the plates 15 which are provided with depending parts 16 which engage right angularly extending plates 17 which are connected with the plates 11, braces 18 being provided for the plates 17. Chains 19 connect these brace plates with the bottoms of the plates 13. On the upper stretch of the cable the plates 13 rest upon the hitches but upon the lower stretch the plates 13 will drop until they are supported by the chains. Small notched pulleys 21 are provided for supporting the lower stretch of the conveyor, the dropping of the plates preventing the same from striking these pulleys, as the pulleys are engaged by the projections on the hitches. Each hitch is provided with a pair of forwardly extending arms 22 and a pair of rearwardly extending arms 23, the rear arms having recesses 24 therein for receiving the ends of the front arms of the next hitch so that each hitch is pushed by the hitch in rear thereof during the operation of the device.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a cable, a plurality of clamping members clamped upon the same, each member having arms thereon, the arms at the front of one member engaging the arms at the rear of the other member and means for connecting supporting elements to the members.

2. A device of the class described comprising a cable, a plurality of clamping members clamped upon the same, each member having arms thereon, the arms at the front of one member engaging the arms at the rear of the other member, means for connecting supporting elements to the clamping members, such means consisting of flexible members connecting each element to a pair of the clamping members so that the element has a limited amount of movement on the clamping members.

3. A device of the class described comprising a cable, a plurality of hitches connected therewith, each hitch consisting of a pair of members arranged to clamp the cable between them, hooked tongues on the members, a plate having slots therein for receiving the tongues and pulley engaging projections on the members.

4. A hitch of the class described comprising a cable, a plurality of hitches located thereon, each hitch consisting of a pair of clamping members, means for holding the members in clamping position, a projection on each member for engaging a pulley, a guiding plate carried by each hitch, a plurality of supporting plates, each provided with a depending part for engaging the guiding plates, flexible members for connecting the supporting plates with the hitches and arms on the hitches, the arms on the front of each hitch engaging the arms on the rear of the next preceding hitch.

5. A device of the class described comprising a pair of members adapted to be arranged on opposite sides of a cable, a plate arranged at one end of said members and engaging a portion of each of said members to prevent outward movement thereof, and means for clamping the opposite ends of said members together to grip them about the cable.

6. A device of the class described comprising a pair of members adapted to be arranged on opposite sides of a cable, each of said members being provided adjacent one end with a projecting tongue, a plate arranged adjacent said members and provided with apertures to receive said tongue, and means for clamping the opposite ends of said members together to grip them about the cable.

7. A device of the class described comprising a pair of members adapted to be arranged on opposite sides of a cable, each of said members being provided adjacent one end with a depending outwardly turned tongue, a plate arranged adjacent said members and provided with apertures to receive said tongues, and means for clamping the opposite ends of said members together to grip them about a cable.

In testimony whereof I affix my signature.

MILTON D. LAKIN.